(12) United States Patent
Wei et al.

(10) Patent No.: US 8,477,331 B2
(45) Date of Patent: Jul. 2, 2013

(54) APPARATUS AND METHOD FOR CREATING AN ELECTRONIC VERSION OF PRINTED MATTER

(75) Inventors: Winston Ser Tuen Wei, Singapore (SG); Wei YongJian, Singapore (SG)

(73) Assignee: Property Publications Pte Ltd., Singapore (SG)

( * ) Notice: Subject to any disclaimer, the term of this patent is extended or adjusted under 35 U.S.C. 154(b) by 1099 days.

(21) Appl. No.: 10/876,430

(22) Filed: Jun. 25, 2004

(65) Prior Publication Data

US 2005/0288943 A1    Dec. 29, 2005

(30) Foreign Application Priority Data

May 27, 2004 (SG) ............................ 200403322-1

(51) Int. Cl.
*G06F 3/12* (2006.01)

(52) U.S. Cl.
USPC ....... 358/1.15; 358/1.13; 358/1.14; 358/1.16; 345/419; 345/626; 493/320; 493/325

(58) Field of Classification Search
USPC ................ 707/100; 709/219; 358/1.15, 1.13, 358/1.5
See application file for complete search history.

(56) References Cited

U.S. PATENT DOCUMENTS

| | | | | |
|---|---|---|---|---|
| 5,835,923 | A * | 11/1998 | Shibata et al. ................ | 715/246 |
| 6,279,013 | B1 * | 8/2001 | LaMarca et al. .............. | 715/210 |
| 6,330,543 | B1 * | 12/2001 | Kepecs ........................ | 705/14.17 |
| 6,606,415 | B1 * | 8/2003 | Rao ............................. | 382/239 |
| 6,983,331 | B1 * | 1/2006 | Mitchell et al. .............. | 709/246 |
| 7,038,807 | B1 * | 5/2006 | Karres ......................... | 358/1.18 |
| 7,191,399 | B2 * | 3/2007 | Ohtani et al. ................ | 715/517 |
| 7,210,099 | B2 * | 4/2007 | Rohrabaugh et al. ........ | 715/249 |
| 7,310,779 | B2 * | 12/2007 | Carro ........................... | 715/763 |
| 2001/0017707 | A1 * | 8/2001 | Lee .............................. | 358/1.12 |
| 2001/0037348 | A1 * | 11/2001 | Nakada et al. ............... | 707/530 |
| 2002/0087598 | A1 * | 7/2002 | Carro ........................... | 707/513 |
| 2002/0087898 | A1 * | 7/2002 | Bormann et al. ............ | 713/300 |
| 2002/0091738 | A1 * | 7/2002 | Rohrabaugh et al. ........ | 707/517 |
| 2002/0109680 | A1 * | 8/2002 | Orbanes et al. .............. | 345/418 |
| 2002/0198701 | A1 * | 12/2002 | Moore .......................... | 704/2 |
| 2004/0093565 | A1 * | 5/2004 | Bernstein et al. ............ | 715/531 |
| 2004/0093568 | A1 * | 5/2004 | Lerner et al. ................ | 715/541 |
| 2004/0146199 | A1 * | 7/2004 | Berkner et al. .............. | 382/176 |
| 2004/0205627 | A1 * | 10/2004 | Rosenholtz et al. ......... | 715/526 |
| 2004/0262051 | A1 * | 12/2004 | Carro ........................... | 178/18.05 |
| 2005/0013104 | A1 * | 1/2005 | Feague et al. ................ | 361/683 |

FOREIGN PATENT DOCUMENTS

SG        200301630-0        4/2006

* cited by examiner

*Primary Examiner* — Twyler Haskins
*Assistant Examiner* — Brendan McCommas
(74) *Attorney, Agent, or Firm* — Greer, Burns & Crain, Ltd.

(57) ABSTRACT

The present invention relates to an apparatus and method for creating an electronic version of printed matter. Advantageously, the electronic version of the printed matter is such that is has the same appearance and layout as the printed matter. The electronic version of the printed matter is also such that that a viewer's interaction with the electronic version can trigger the sending of information to the viewer. The information can be in various forms including an e-mail or e-coupon. It comes with an intelligence and interactive module where viewers can read other languages' printed matter instantaneously with multi-lingual translation both in text and voice. The apparatus and method is also capable of compressing the electronic version so that it can be quickly and efficiently distributed to viewers over numerous networks. These networks can include LAN, WAN, internet, or mobile and wireless communication networks.

39 Claims, 6 Drawing Sheets

APPARATUS AND METHOD FOR CREATING AN ELECTRONIC VERSION OF PRINTED MATTER

This application claims §119 priority to Singapore Patent Application No. 200403322-1 entitled AN APPARTUS AND METHOD FOR CREATING AN ELECTRONIC VERSION OF PRINTED MATTER, which was filed on May 27, 2004.

FIELD OF THE INVENTION

The present invention relates generally to an apparatus and method for creating an electronic version of printed matter, and is of particular but by no means exclusive application to creating an on-line and off-line version of a newspaper or magazine.

BACKGROUND OF THE INVENTION

With the prevalence of computer technology, producers of printed matter often create electronic versions of their printed matter before sending out to print (such as newspapers, magazines and books). The electronic versions provide many advantages such as ease in making changes, being readily printable and the ability to be quickly and efficiently distributed to a large number of people over a wide geographic region (particularly via the Internet). However, it takes a long time to deliver and download since the files are normally very big.

Usually the publishers or designers will use desktop publishing software such as Quarkxpress®, CorelDraw® to create their printed matter and saving them in digital file format like PDF, TIFF and JPEG before sending out for print. The file size is big and likewise the dedicated viewer is required for viewing the file, thus making it not ideal for easy browsing and distribution over the web or other media.

In the late 1990s, Internet news portals blossomed in the World Wide Web due to the investment craze in the financial market. They utilized little software to process their images and text information before porting to a content-management system like Interwoven®, Vignette® to create templates for their news articles. This has proven to be both cost and labor intensive and most of them are not profitable. Many newspaper publishers also jump into this way of publishing their news fearing the Internet news portals will grab away their business if they did not do the same thing. Many lost money and find it more and more difficult to operate nowadays. Many are also not publishing in the web due to the above problems, especially magazine publishers. Therefore, it is the intention of this invention to address these problems where publishers are able to create an electronic version of their printed matter after their usual design process by converting them to the web in very small files which are easy for distribution and browsing.

Electronic versions of the printed matter at the web often have a different appearance to that of their printed matter counterparts. The reason that the electronic versions have a different appearance is that information contained therein can be difficult to discern if presented with the same appearance as the printed version. For example, the text may be too small to read. Consequently, the appearance of the electronic version for the web needs to be adapted in a manner that permits the information to be readily discerned when viewed. Unfortunately, changing the appearance of the electronic versions at the web can lead to a 'double identity' problem. Essentially, this means that viewers of the printed matter and the electronic version thereof may be given the impression that both publications are from different sources, or are different publications altogether.

Furthermore, there is a dire need to provide fast download of those images and textual information via a more superior compression format than the current commonly used web image formats like JPEG and GIF, to create an adaptive and friendly browsing environment for readers to read those electronic version of the printed matter like newspapers and magazines. Another intention of this invention to create a compelling compression system and algorithms for multi-channel distribution (Internet, wireless, mobile phone, PDA, satellite etc) of multi-format to enhance the distribution of content worldwide.

Beside the creation of such printed matters to electronic version, there is no business process interactivity built-in with the articles, images or advertisements like web-interactive feedbacks, e-coupons, special offers, e-commerce capabilities etc while browsing and viewing those articles and advertisements. At the moment they are just plain texts and images. It is another intention of this invention to create compelling business templates while transforming the electronic version of the printed matters to compressed format in one go.

In addition, due to vast number of newspapers available worldwide in different languages, there are rising needs to read the news of the other country in different languages. As the world is getting smaller and country to country is getting more connected, to read other language newspaper becomes necessary and sometimes critical for business success.

It is the intention of this invention to have an interactive multi-lingual dictionary whereby understanding the content of newspapers in other languages becomes easy. Furthermore, it can increase foreign language literacy and learning of languages through newspapers, both through text and voice in simultaneous digital translation.

Understanding the content of newspapers in foreign languages not only gives first hand knowledge of the happenings of the countries, but also the culture and customs. This makes the world a more peaceful place to live for different races and bridges the language barrier that many readers have concerning foreign language newspapers.

Furthermore, due to the short time span where daily newspaper content is prepared, any foreign language translation needs to be done swiftly in order to beat the time for publishing and delivery. Therefore, instead of getting the foreign language version of newspapers being translated daily electronically, which is time consuming, the digital content can be kept untouched with the present invention where the invention's intelligence and interactive module will facilitate the understanding of the newspaper in other foreign languages through digital simultaneous translation of word by word in text and/or voice.

The invention is intuitive and easily used by readers who are able to understand the content of these foreign newspapers. The present invention is able to present the articles content in digital text, and just by selecting or highlighting the word(s) or paragraph(s) in the article window and by right-clicking on the mouse, a window will open up that will show the actual word(s) on the left and the corresponding translated word(s) on the right.

In addition, the invention provides alternative meanings of each word and presents them correspondingly on the right of each word. It is more accurate for a human being to gauge the right meanings for the word(s) in context rather than machine artificial intelligence translation of the sentence.

The software allows text articles and translated words to be read to them by clicking and accelerates the understanding and learning of foreign languages, and is especially useful for those who are visually impaired or cannot read or understand the text.

SUMMARY OF THE INVENTION

According to a first aspect of the present invention, there is provided an apparatus for creating an electronic version of printed matter, the apparatus including: a data reading means arranged to obtain image data which can be used to present an electronic image of the printed matter, the electronic image having substantially the same appearance as the printed matter, and a region containing information which cannot be readily discerned when viewed; an input means arranged to obtain information data which can be used to present the information contained in the region in a manner that allows the information to be readily discerned when viewed; a creating means arranged to create a reference which can be used to retrieve the information data; and a processing means arranged to process the image data and the reference in order to create presentation data, wherein the presentation data can be used to present the electronic image, and to retrieve the information data so that it can be used to present the information contain in the region in a manner that is readily discernible.

Preferably, the processing means is capable of using the presentation data, wherein the processing means uses the presentation data to present the electronic image on a presentation device and retrieve the information data, whereupon retrieving the information data the processing means uses the information data to present the information contained in the region on the presentation device.

Preferably, the processing means in such that it is capable of changing the image data and/or information data in order to effect a change in the electronic image and/or the information contained in the region, respectively.

Preferably, the input means is capable of changing the information data in order to effect a change in the information.

Preferably, the data reading means is capable of changing the image data in order to effect a change in a resolution of the electronic image.

Preferably, the processing means is capable of compressing the presentation data.

Preferably, the processing means compresses the presentation data by identifying a text region and an image region within the electronic image, the processing means being such that it uses a first compression algorithm to compress the text region, and a second compression algorithm to compress the image region.

Preferably, the first compression algorithm includes a text compression algorithm.

Preferably, the second compression algorithm includes a hybrid graphic compression algorithm.

Preferably, the processing means combines the outputs of the first compression algorithm and the second compression algorithm to produce a compressed version of the presentation data.

Preferably, the apparatus includes distribution means arranged to distribute the presentation data, via a communication system, to a recipient.

Preferably, the communication means includes a LAN, WAN, the Internet, mobile phone network, or satellite network.

Preferably, the presentation data can be used to send data to the processing means.

Preferably, the data includes an e-mail or e-coupon.

Preferably, the information contained in the region of the electronic image includes text.

Preferably, the printed matter includes a newspaper or magazine.

Preferably, the data reading means, input means, creating means, and processing means include software which can be run on a computer.

According to a second aspect of the present invention, there is provided a method for creating an electronic version of printed matter, the method including the steps of:

obtaining image data which can be used to present an electronic image of the printed matter, the electronic image having substantially the same appearance as the printed matter, and a region containing information which can not be readily discerned when viewed;

obtaining information data which can be used to present the information contained in the region in a manner that allows the information to be readily discerned when viewed;

creating a reference which can be used to retrieve the information data; and processing the image data and the reference in order to create presentation data, wherein the presentation data can be used to present the electronic image, and to retrieve the information data so that it can be used to present the information contain in the region.

Preferably, the processing step further includes using the presentation data to present the electronic image on a presentation device, and to retrieve the information data, whereupon retrieving the information data the processing step uses the information data to present the information contain in the region on the presentation device.

Preferably, the processing step further includes changing the image data and/or information data in order to effect a change in the electronic image and/or the information contained in the region, respectively.

Preferably, the step of obtaining the information data includes changing the information data in order to effect a change in the information.

Preferably, the step of obtaining the image data includes changing the image data in order to effect a change in a resolution of the electronic image.

Preferably, the processing step includes compressing the presentation data.

Preferably, compressing the presentation data includes identifying a text region and an image region within the electronic image, the processing means being such that it uses a first compression algorithm to compress the text region, and a second compression algorithm to compress the image region.

Preferably, the first compression algorithm includes a text compression algorithm.

Preferably, the second compression algorithm includes a hybrid graphic compression algorithm.

Preferably, compressing the presentation data includes combining the outputs of the first compression algorithm and the second compression algorithm to produce a compressed version of the presentation data.

Preferably, the method includes the step of distributing the presentation data, via a communication system, to a recipient.

Preferably, the communication means includes a LAN, WAN, the Internet, mobile phone network, or satellite network.

Preferably, the presentation data can be used to send data to a device.

Preferably, the data includes an e-mail or e-coupon.

Preferably, the information contained in the region of the electronic image includes text.

Preferably, the printed matter includes a newspaper or magazine.

According to a third aspect of the present invention, there is provided software which, when processed by a computing device, allows the computing device to carry out the method of the second aspect of the present invention.

According to a fourth aspect of the present invention, there is provided a computer readable medium containing the presentation data of the second aspect of the present invention.

According to a fifth aspect of the present invention, there is provided software which, when processed by a computing device, allows the computing device to translate and digitise the text to any foreign language & with audible voice of the presentation data of the second aspect of the present invention.

Preferably, it translates the text data from native language to be that of foreign languages.

Preferably, it processes and provides alternative meanings of the each word of the text data.

Preferably, the processing step further includes using an intelligent programming module to decipher the most probable corresponding meaning of the word and list them as the first word.

Preferably, processing the text data to audible voice may it be of native or machine driven.

Preferably, as it read out the text data to audible voice, it will highlight the corresponding word on the display window.

Various Business Models that can be deployed based on key benefits of the innovation include, An existing newspaper publisher that distributes free newspaper has a daily circulation of more than 200 thousands and is looking to extend its circulation but the printing cost of physical newspapers is high and proven not viable to increase its circulation through physical circulation.

The strategy that we have advocated would be circulating it digitally via the Internet email since it is compressed and small. The advantage is that the increased circulation cost will only be the set up of such system and also the monthly operating and yearly maintenance cost which is not dependant on the increase physical printing circulation. This is unlike physical hardcopy circulation which is exorbitant and proportionally dependent on the circulation.

Furthermore, by having an Internet medium, it is both borderless and available twenty-four hours a day, seven days a week, for any viewer to view these electronic newspapers anytime, anywhere, as long there is on-line connectivity. The distribution time of the daily newspaper will be tremendously reduced as there will not be any physical printing and logistic distribution which are labor, cost and time intensive.

Through the adoption of the on-line circulation, the newspaper publisher is able to have a wider and borderless circulation and advertisers will be pleased to advertise frequently to reach out to this group of readers. This will increase the profitability of the publisher as they can increase the cost for the placement of advertisement.

Due to the small packaged file of the electronic newspaper, the electronic newspapers are emailed free to readers who want to receive them and the publishers will in turn acquire the bio-data that they would like to collect. An off-line e-newspaper viewer will be distributed with basic viewing function but without search, print and book-marking capabilities.

With the collected bio-data and demographics of the subscribers, those segments with the advertisements that the advertisers wanted to target can be targeted. This creates a new media of advertising which is a more effective niche and target marketing solution unavailable to current newspapers.

For those who are paid subscribers, an enhanced offline e-newspaper viewer will be distributed that allows multiple functions such as search, print and book-marking (for research referencing or academic purposes), e-mailing (share the selected articles with others via email with personalized messages) capabilities etc. In the email delivery, it can be in three formats: detail, ordinary and thumbnail. For the actual delivery, all pages with each page in detail or all pages in thumbnail and some pages in detail or all pages in ordinary and thumbnail and some pages in detail format, may be delivered. All types of combinations and variations are possible, but the end result depends on how big the total packaged file that the newspaper's publishers wanted to deliver to its customers. No matter what, whenever there are pages that are not in detail and when one opens up the file it will automatically logon via the Internet to the e-newspaper portal to verify the readers' authenticity before securely downloading the detailed pages at the background, while one is reading the already delivered e-newspapers. This provides seamless reading experience and allows the publishers to track and profile the readers' reading habits, which is useful for the e-marketing strategy.

Another example is that the compressed newspapers are put into the newspaper portal for public viewing via a web browser and periodically downloaded via email and viewed through an off-line viewer. In viewing via a web browser configuration, the readers can view and read the e-newspaper, but without search, print and book marking (for research referencing or academic purposes), e-mailing (to share the selected articles with others via email with personalized messages) capabilities etc. This is to encourage readers to subscribe as paid subscribers and offer the latter functionalities to them. This is a model which has the "push" and "pull" factor where the public can login anywhere to view and gain access to such newspaper and premium services.

The other example is the invented format being placed at the newspaper portal and only replacing the existing e-newspaper of html. This will save tremendous cost of the newspaper in producing the existing e-newspaper and will also enable the newspaper to operate more efficiently, as they are able to concentrate on what they are good at producing the print newspaper and later just transforming it to the innovative e-newspaper.

BRIEF DESCRIPTION OF THE DRAWINGS

Notwithstanding any other embodiments that may fall within the scope of the present invention, a preferred embodiment of the present invention will now be described, by way of example only, with reference to the accompanying Figures, in which.

A PREFERRED EMBODIMENT OF THE INVENTION

Figure 1:
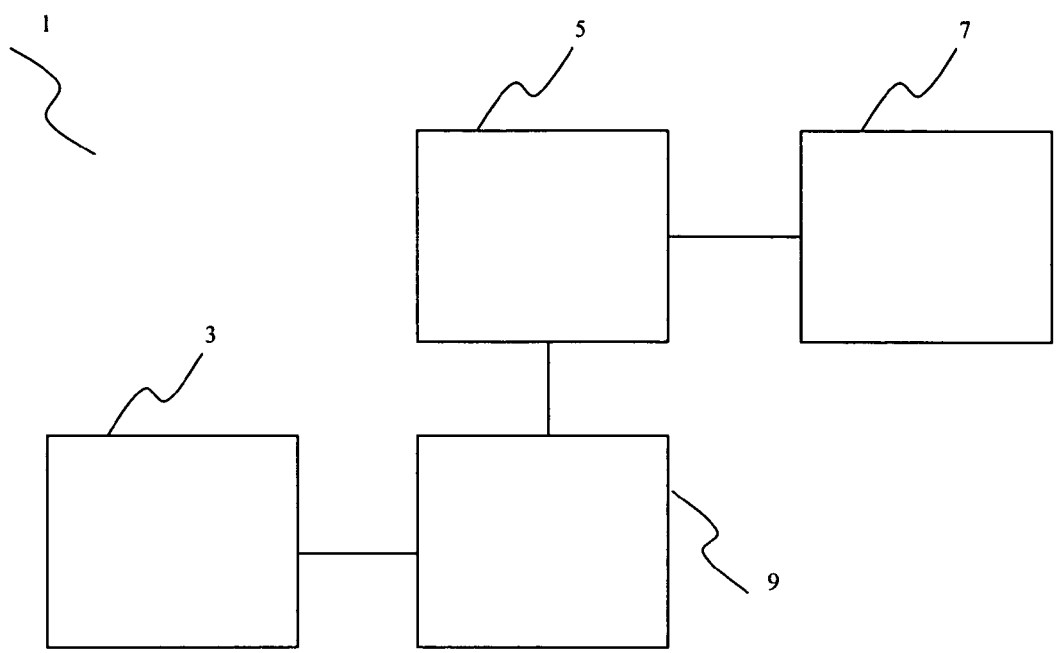
FIG. 1 illustrates a block diagram of a computer system including the apparatus and method according to the preferred embodiment of the present invention.

FIG. 1 illustrates a computer system 1 which includes the apparatus 3 according to the preferred embodiment of the present invention. The apparatus 3 is in the form of a computer. The system also includes a storage medium 5 in the form of a computer database, a distribution means 7 in the form of an Internet web server, and an image processor 9 in the form of a scanner or utilizing the digital image output (entire high resolution page) exported directly from the current printing/publishing software. The apparatus 3 and storage medium 5 are interconnected together via a local area network so that they can exchange data. The apparatus 3 is connected to the image processor 9. The storage means 5 and distribution means 7 are also interconnected to each other via the local area network so that they too can exchange data with each other.

The apparatus 3 includes a data reading means for obtaining image data which can be used to present an electronic image of the printed matter. The electronic image has substantially the same appearance as the printed matter, and includes a region containing information which cannot be readily discerned when viewed.

The data reading means is in the form of software which allows a user to operate the image processor 9, and hardware in the form of an input/output port. The software provides a graphical user interface for allowing the user to easily operate the image processor 9. The software interacts with the image processor 9 via the input/output port, the latter of which is connected directly to the image processor 9 via a data cable.

To commence the process of creating an electronic version of printed matter (such as a newspaper), a user first places the printed matter into the image processor 9 for scanning. Using the software of the data reading means, the user instructs the image processor 9 to scan the printed matter. Upon scanning the printed matter, the image processor 9 creates the image data (which is in the data format defined by the Joint Photographic Expert Group). The image processor 9 forwards the image data (via the data cable) to the input/output port of the data reading means. The software of the data reading means then proceeds to obtain the image data by reading it from the input/output port.

Once the data reading device has obtained the image data, it places the image data in the storage medium 5 for later use.

Using appropriate image reading software (for example, a web browser), the image data can be used to create an electronic image of the printed matter which has substantially the same appearance as the printed matter, and a region which contains information that cannot be readily discerned. The information in the region includes text.

The apparatus 3 also includes an input means for obtaining information data which can be used to present the information contained in the region in a manner that allows the information to be readily discerned when viewed.

The input means is in the form of software which causes the apparatus 3 to present a graphical user interface. The user of the apparatus 3 can enter into the graphical user interface information (text) which corresponds to the information contained in the region. Once the information (text) has been entered into the graphical user interface, the software creates the information data, which reflects the information entered in to the graphical user interface. The information data is in the form of a text data file.

The apparatus 3 stores the information data in a storage medium 5 for later use.

The apparatus 3 has a creating means for creating a reference which can be used to retrieve the information data. The creating means is in the form of software, while the reference data is in the form of a link (such as a hypertext mark-up link) to the information data.

The apparatus 3 includes processing means, in the form of software, for processing the image data and the reference in order to create presentation data. The processing means is capable of accessing the storage medium 5 in order to retrieve the image data and information data for processing. When processed by a computing device, the presentation data allows the computing device to present the electronic image of the printed matter, and to retrieve the information data so that the information contained in the region of the image can be presented in a manner that can be readily discerned.

Upon creating the presentation data, the apparatus 3 forwards the presentation data, which is in the form of hypertext mark-up language, to the storage medium 5 for use by the distribution means 7. In order to conserve storage space and allow relatively speedy delivery, the processing means compresses the presentation data.

Figure 4:
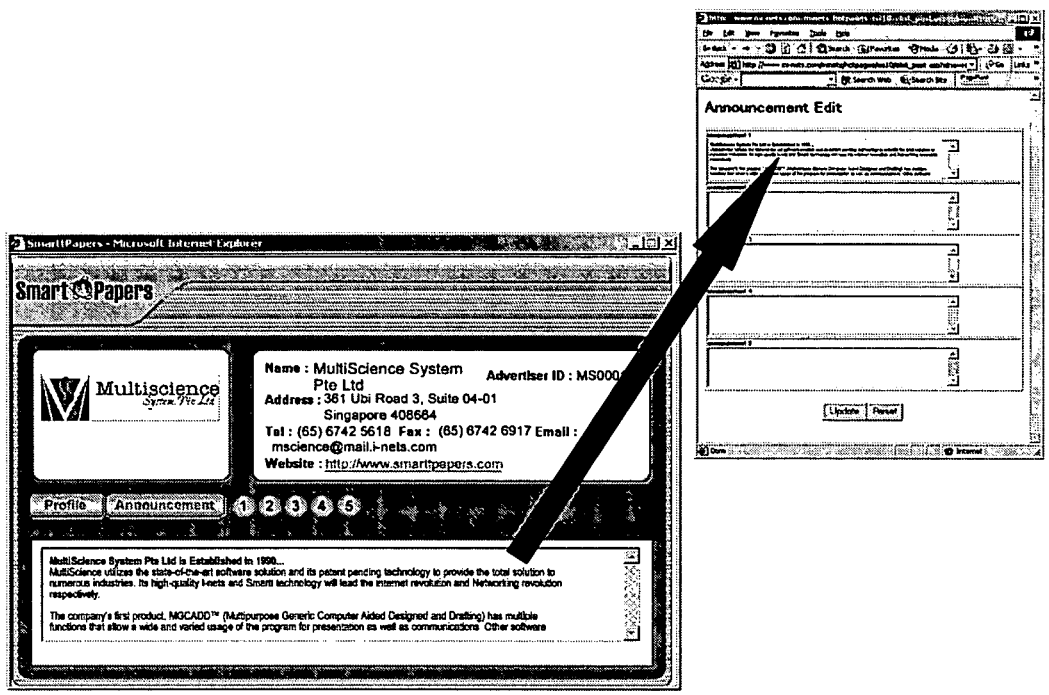
FIG. 4 illustrates an image of an editing tool which allows the electronic image to be edited.

The apparatus 3 also allows a user thereof to change (edit) the electronic image of the printed matter and the information data. Consequently, the apparatus 3 is also capable of processing the presentation data. The apparatus allows the user to change/edit aspects such as the resolution of the electronic image and the information data. For example, where the electronic image contains a number of advertisements, the processing means allows a user to log-on to the apparatus 3. The log-on process is password protected to ensure only authorised users edit the electronic image. Once logged-on to the apparatus 3, he/she is presented with the electronic image, and can simply 'click' on the advertisement therein, for example, to edit the advertisement. Clicking on the advertisement causes an appropriate editing tool to be presented to the user. The editing tool contains the advertisement to be edited. The editing tool is such that the user can change an image portion and/or text portion of the advertisement. When the user has completed the edits, the tool can be closed and the processing means makes the appropriate changes to the image and/or information data. FIG. 4, illustrates an image of the editing tool which is presented to a user.

Figure 2:
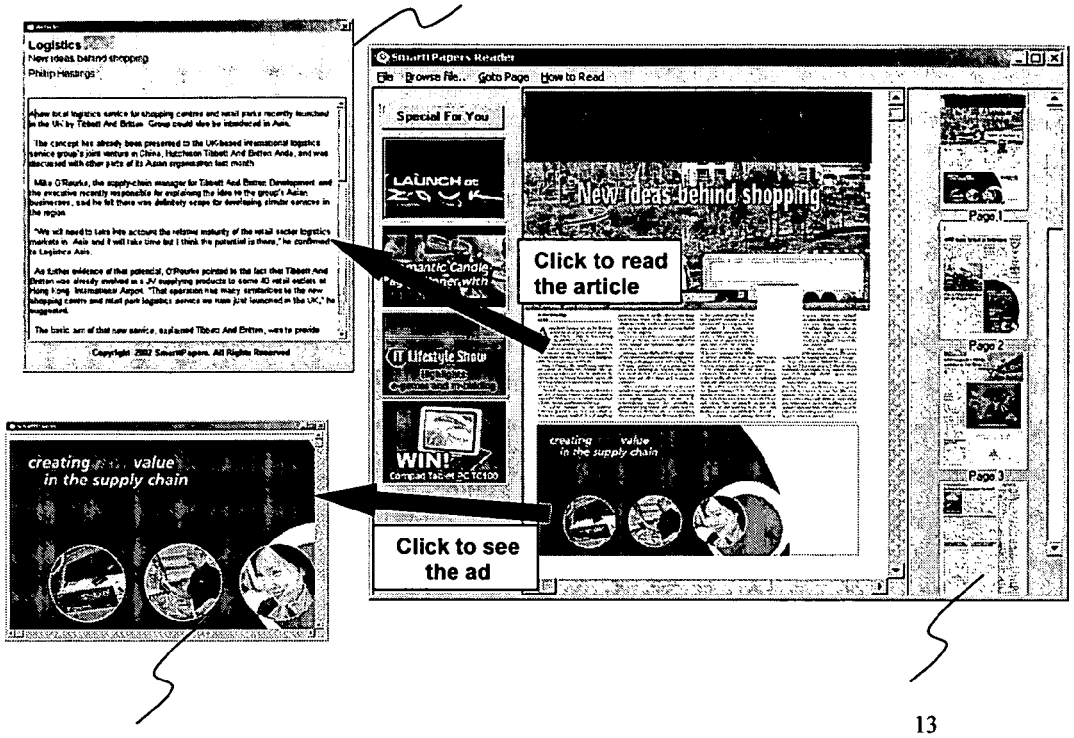
FIG. 2 illustrates an electronic image presented by the system of FIG. 1.

When a user wishes to view the electronic image of the printed matter, they can log-on to the distribution means 7 using a web browser. The distribution means 7 will forward the presentation data to the web browser, which on processing the presentation data, displays the electronic image of the printed matter. An example of the electronic image as displayed by the web browser is shown in FIG. 2. The image displayed in FIG. 2 is a newspaper. The text of the newspaper is the region that cannot be readily discerned. In order to read the text the viewer simply clicks on the text, which cause a window 11 to "pop-up". The window 11 contains the text in a format which can be readily discerned by a viewer. The image also contains a number of thumbnail images 13 which can be clicked on to view the text therein. Each of the thumbnail images 13 represents other pages in the newspaper. Upon clicking on the electronic image, the user's browser uses the presentation data (in particular the reference) to retrieve the information data.

Figure 5:
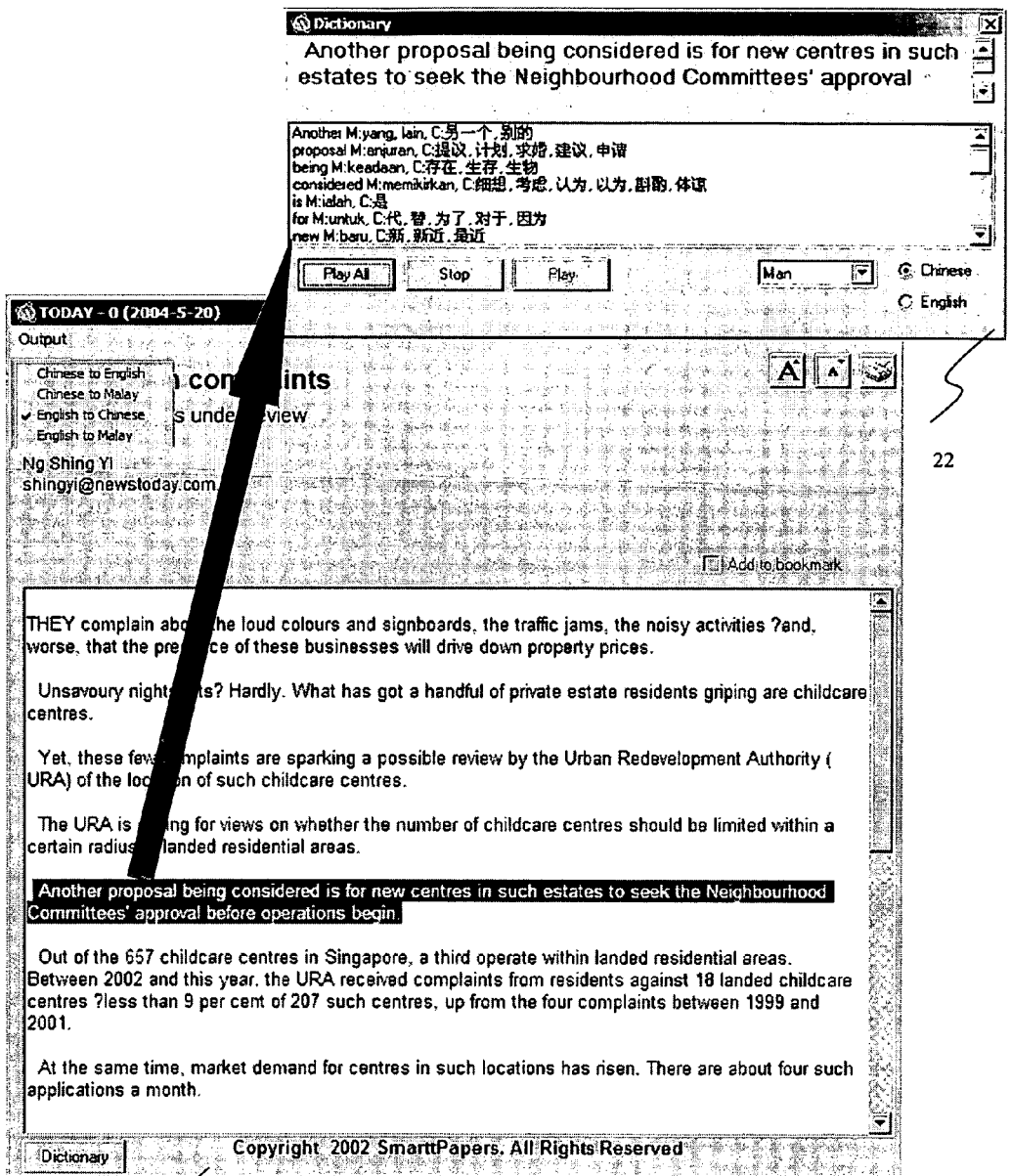
FIG. 5 illustrates the text of the presentation data being highlighted and translated to foreign languages and alternative meanings for each word and the translated text being digitally transformed to audible voice.

FIG. 5 illustrates the text of the presentation data being highlighted and translated to foreign languages and alternative meanings for each word and the translated text being digitally transformed to audible voice. When the user has problem understanding the text of the newspaper, he can select or highlight the word(s) or paragraph(s) in the article window 20, and right click on the mouse or via the menu bar, it will pop-up a translation window 22 that will show the actual word(s) on the left and the corresponding translated word(s) on the right.

Furthermore, there is a language selection option on the top menu bar that allows you to select the languages of the newspapers to be translated from the original newspaper language to a foreign language that the reader understands.

Supported languages are English, Chinese, Malay, French, Spanish, Russian, German, Italian, Korean, Japanese, etc. Translation products in the market are generally far from perfect and often produce some comical results, but in general, considering the complexities involved, the invention works well and allows the readers to quickly decipher the meaning of the whole text. It allows the reader to read foreign language newspaper and gain interesting world perspectives that the reader otherwise could not access.

In addition, for those who are visually impaired or cannot read or understand the language of the text, by clicking on the "play" button, it will translate the highlighted texts to audible voice that is either native or machine driven via text-to-Speech engine or real-voice engine (wave format) which is compressed.

Figure 6:
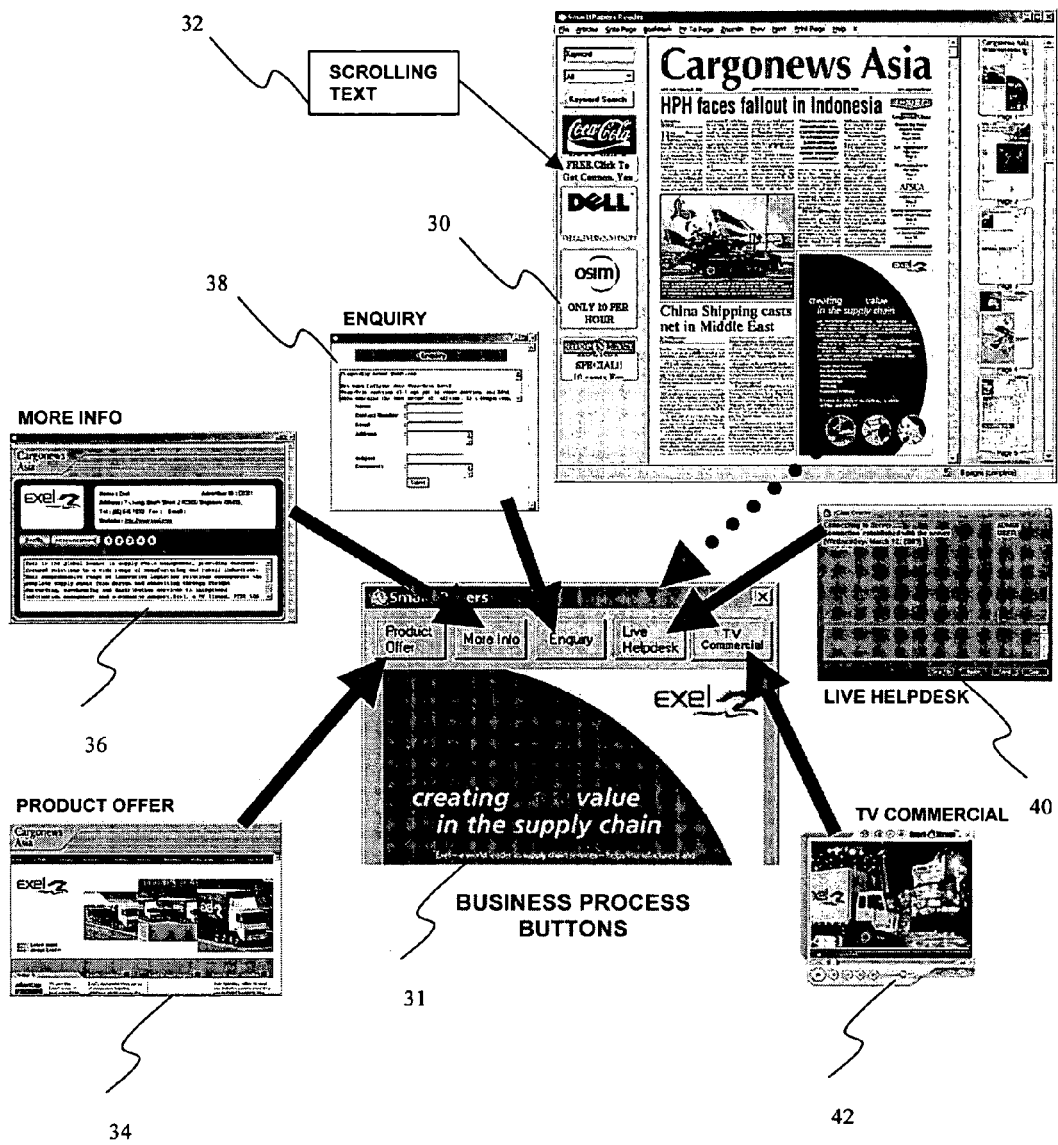
FIG. 6 illustrates a detailed functionalities of electronic image presented by FIG. 2, a pop-up window which is an advertisement having tagged with additional business process buttons.

FIG. 6 illustrates a detail functionalities of electronic image presented by FIG. 2, pop-up window 15 which is an advertisement tagged with additional business process buttons. In the example, a few main business processes are highlighted and it is susceptible to variations and modifications other than those specifically described. Under window 34, the Product Offer window is shown which showcases the product or service offer and is able to display any updated offer by the company.

For the customer/reader to know about the advertised company's profile, information and announcements, this information can be seen as in window 36 and the information can be updated by the company via a valid login through a web page. In the event whereby the customer/reader needs to inquire about the product or service, the customer/reader can click on the inquiry button and it will pop-up window 38 for the customer/reader to submit their inquiry. If urgent inquiry is required, the customer/reader can click on the live helpdesk service button where there will be a helpdesk staff assisting them via the real-time textual chat window 40, where one helpdesk staff can handle multiple inquiries concurrently.

Normally, a marketing campaign will have both printed and TV advertisement. Therefore, through the providence of the video button, it will pop-up a compressed video window 42 to bring the similar marketing message to the customer/reader.

Furthermore, under each advertisement electronic image in the example as displayed by the reader program is shown in window 30, there is an auto-scrolling advertising text 32 which can be updated online by the advertisers via valid login through a web page.

It will be appreciated that whilst the preferred embodiment describes using the Internet to distribute the electronic image of the presented matter, it is possible to distribute the electronic image using communication systems including mobile phones, portable PDAs and satellite technology.

As described, clicking on the region in the electronic image results in a further window 11 appearing which contains the information in a readily discernible format. It is also envisioned that the electronic image includes advertisements 15, which, when clicked on, trigger other events such as information being e-mailed to viewer of the image or sending of an e-coupon.

The process of retrieving the information data involves the browser sending a request for the information data to the distribution means 7. On receiving the request, which identifies the information data, the distribution means 7 accesses the storage medium 5 and obtains the information data. The distribution means 7 then forwards the presentation data to the user's computer. When the user's computer receives the presentation data, the web browser processes the information data and displays it in a 'window'. As outlined previously, the user can discern the information contained in the region of the electronic image by viewing the window.

Figure 3:
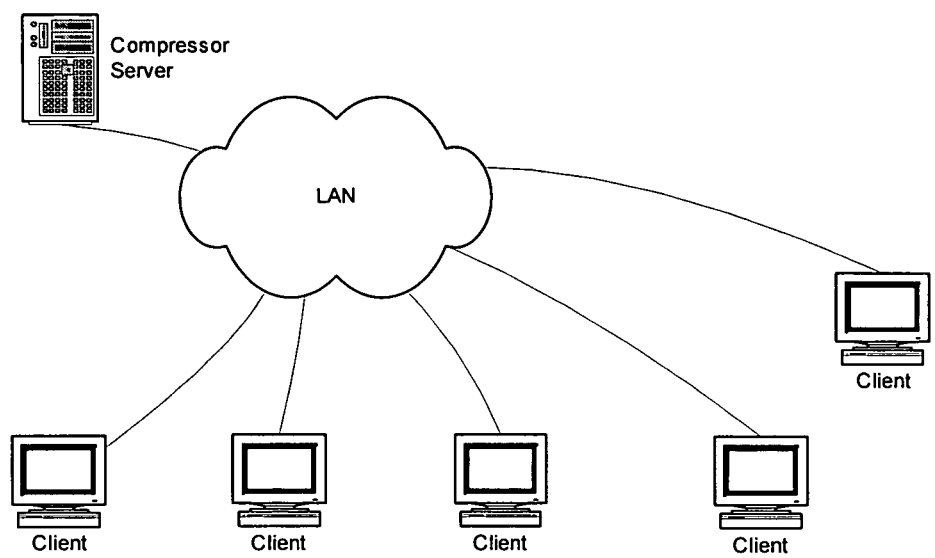
FIG. 3 illustrates a distributed architecture which can be used by the preferred embodiment of the present invention to compress an electronic image.

The compression algorithm of the preferred embodiment is such that it can be executed on a single server. However, this can require a very powerful server and may take too long if the server is required to carry out numerous compression tasks. It is envisioned that the preferred embodiment can execute the compression algorithm in a distributed manner by utilizing the existing editors' and designers' workstations (which are normally powered by powerful Pentium 4 processors or are under utilized as they are using it for web-browsing and word-processing only). FIG. 3 illustrates an architecture of the distributed computing system which allows the compression algorithm to be executed in a distributed manner.

The existing editors' and designers' workstations are networked so that compression of the electronic image can be readily carried out in the distributed manner. The distributed technique deploys the use of a compressor server which distributes the image files to be compressed to the networked clients' workstation (editors' workstation) for compressing. Once completed, the compressor server automatically consolidates the compressed files for further processing.

The software running on the workstations is such that 10 it monitors the editor's workstation CPU usage to efficiently utilize the CPU power to compress those image files. Primarily, it will fully utilize the editor's workstation CPU power when the workstation is in idle mode or low utilization level and vice-versa when the CPU is 15 fully utilized by the editors or designers.

Those skilled in the art will appreciate that the invention described herein is susceptible to variations and modifications other than those specifically described. It should be understood that the invention includes all such variations and modifications which fall within the spirit and scope of the invention.

The claims defining the invention are as follows:

1. An apparatus for creating an electronic version of machine printed matter, the apparatus including:

a data reading means arranged to optically obtain image data which can be used to present an electronic image of the printed matter, the electronic image having substantially the same appearance as the printed matter, and a region containing machine printed information which cannot be readily discerned;

an input means arranged to obtain and modify text-based information data entered by a user and representing the information contained in the region containing machine printed information which cannot be readily discerned when viewed by a viewer different and remote from the user in a manner that allows the information to be readily discerned;

a creating means arranged to create a reference which can be used to retrieve the information data; and a processing means arranged to process the image data and the reference in order to create presentation data, wherein the presentation data can be used to present the electronic image, and to retrieve the information data so that it can be used to present the information contained in the region in a manner that is readily discernible by the viewer.

2. The apparatus of claim 1, wherein the processing means is capable of using the presentation data, wherein the processing means uses the presentation data to present the electronic image on a presentation device and retrieve the information data, whereupon retrieving the information data the processing means uses the information data to present the information contained in the region on the presentation device.

3. The apparatus of claim 1, wherein the processing means is capable of changing the image data or information data in order to effect a change in the electronic image or the information contained in the region, respectively.

4. The apparatus of claim 1, wherein the input means is capable of changing the information data in order to effect a change in the information.

5. The apparatus of claim 1, wherein the data reading means is capable of changing the image data in order to effect a change in a resolution of the electronic image.

6. The apparatus of claim 1, wherein the processing means is capable of compressing the presentation data.

7. The apparatus of claim 6, wherein the processing means compresses the presentation data by identifying a text region and an image region within the electronic image, the processing means being such that it uses a first compression algorithm to compress the text region, and a second compression algorithm to compress the image region.

8. The apparatus of claim 7, wherein the first compression algorithm includes a text compression algorithm.

9. The apparatus of claim 7, wherein the second compression algorithm includes a hybrid graphic compression algorithm.

10. The apparatus of claim 7, wherein the processing means combines the outputs of the first compression algorithm and the second compression algorithm to produce a compressed version of the presentation data.

11. The apparatus of claim 1, further including distribution means arranged to distribute the presentation data, via a communication system, to a recipient.

12. The apparatus of claim 11, wherein the communication means includes a LAN, WAN, the Internet, a mobile phone network, or satellite network.

13. The apparatus of claim 1, wherein the presentation data can be used to send data to the processing means.

14. The apparatus of claim 13, wherein the data includes an e-mail or e-coupon.

15. The apparatus of claim 1, wherein the information contained in the region of the electronic image includes text.

16. The apparatus as claimed in claim 1, wherein the printed matter includes a newspaper or magazine.

17. The apparatus of claim 1, wherein the data reading means, input means, creating means and processing means include software which can be run on a computer.

18. A method for creating an electronic version of machine printed matter, the method including the steps of:
    optically obtaining image data which can be used to present an electronic image of the printed matter, the electronic image having substantially the same appearance as the printed matter, and a region containing machine printed information which cannot be readily discerned;
    obtaining and modifying text-based information data entered by a user and representing the information contained in the region containing machine printed information which cannot be readily discerned when viewed by a viewer different and remote from the user in a manner that allows the information to be readily discerned when viewed;
    creating a reference which can be used to retrieve the information data; and
    processing the image data and the reference in order to create presentation data, wherein the presentation data can be used to present the electronic image, and to retrieve the information data so that it can be used to present the information contained in the region to the viewer.

19. The method of claim 18, wherein the processing step further includes using the presentation data to present the electronic image on a presentation device, and to retrieve the information data, whereupon retrieving the information data the processing step uses the information data to present the information contain in the region on the presentation device.

20. The method of claim 18, wherein the processing step further includes changing the image data and/or information data in order to effect a change in the electronic image and/or the information contained in the region, respectively.

21. The method of claim 19, wherein the step of obtaining the information data includes changing the information data in order to effect a change in the information.

22. The method of claim 18, wherein the step of obtaining the image data includes changing the image data in order to effect a change in a resolution of the electronic image.

23. The method of claim 18, wherein the processing step includes compressing the presentation data.

24. The method of claim 23, wherein compressing the presentation data includes identifying a text region and an image region within the electronic image, the processing means being such that it uses a first compression algorithm to compress the text region, and a second compression algorithm to compress the image region.

25. The method of claim 24, wherein the first compression algorithm includes a text compression algorithm.

26. The method of claim 24, wherein the second compression algorithm include a hybrid graphic compression algorithm.

27. The method of claim 23, wherein the compressing step includes combining the outputs of the first compression algorithm and the second compression algorithm to produce a compressed version of the presentation data.

28. The method of claim 18, further including the step of distributing the presentation data, via a communication system, to a recipient.

29. The method of claim 28, wherein the communication means includes a LAN, WAN, the Internet, a mobile phone network, or a satellite network.

30. The method of claim 18, wherein the presentation data can be used to send data to a device.

31. The method of claim 30, wherein the data includes an e-mail or e-coupon.

32. The method of claim 18, wherein the information contained in the region of the electronic image includes text.

33. The method of claim 18, wherein the printed matter includes a newspaper or magazine.

34. The method of claim 18, wherein said processing utilizes software for a computing device.

35. The method of claim 18, wherein said presentation data is contained on a computer readable medium.

36. The method of claim 19, wherein the processing step further includes retrieving and presenting the information data in other foreign spoken languages and its corresponding meanings.

37. The method of claim 36, wherein the information data is read out in a native or machine-driven audible voice.

38. The method of claim 19, wherein the processing step further includes retrieving and presenting the information data and through further processing using an intelligent programming module to decipher the most probable corresponding meaning of the word and list them as the first word.

39. The method of claim 19, wherein the processing step further includes retrieving and presenting the information data with additional business process buttons.

\* \* \* \* \*